United States Patent [19]

Hennessee et al.

[11] Patent Number: 5,335,514
[45] Date of Patent: Aug. 9, 1994

[54] VEHICLE AIR CONDITIONER REFRIGERATION, AUTOMATIC VARIABLE SET POINT EVAPORATOR SYSTEM THEREFOR

[75] Inventors: Robert P. Hennessee, Rochester Hills; David A. Barwin, Troy; Robert G. Rudzewicz, Sterling Heights; Richard M. Rajala, Auburn Hills, all of Mich.

[73] Assignee: Chrysler Corporation, Highland Park, Mich.

[21] Appl. No.: 71,147

[22] Filed: Jun. 1, 1993

[51] Int. Cl.$^5$ .................................................. B60H 3/00
[52] U.S. Cl. ........................................ 62/227; 62/209
[58] Field of Search ................. 62/227, 209, 208, 244, 62/239, 243, 203; 165/42, 43; 236/91 R, 91 F, 91 G, 91 C

[56] References Cited

U.S. PATENT DOCUMENTS

| | | | |
|---|---|---|---|
| 4,753,083 | 6/1988 | Sato | 62/209 |
| 4,856,293 | 8/1989 | Takahashi | 62/227 X |
| 4,909,043 | 3/1990 | Masauji et al. | 62/227 X |
| 5,201,862 | 4/1993 | Pettitt | 62/227 X |
| 5,216,836 | 6/1993 | Jarosch | 62/227 |

FOREIGN PATENT DOCUMENTS 59-230814 12/1984 Japan ...................... 62/209

Primary Examiner—Harry B. Tanner
Attorney, Agent, or Firm—Wendell K. Fredericks

[57] ABSTRACT

A method and software/firmware fixed capacity compressor control system for varying the set point temperature of a evaporator in response to changes in ambient temperature in order to produce optimum cooling in the passenger compartment of a vehicle while preventing frost from accumulating on the fins of the evaporator. The system includes an evaporator probe and an outside ambient sensor and firmware for computing set-point steady state temperatures values over a wide range of ambient temperature. Also circuits are provided for cycling ON and OFF a fixed capacity compressor in a manner to achieve optimum cooling in the passenger compartment of the vehicle in response to the computed evaporator set point temperatures.

5 Claims, 5 Drawing Sheets

VEHICLE AIR CONDITIONER REFRIGERATION, AUTOMATIC VARIABLE SET POINT EVAPORATOR SYSTEM THEREFOR

FIELD OF THE INVENTION

The present invention relates generally to air conditioning control systems and, more particularly, to techniques for achieving the coldest refrigerated air temperatures downstream from an evaporator without causing frost on the evaporator fins from fan forced upstream ambient air.

BACKGROUND OF THE INVENTION

Normally in vehicles using a fixed capacity compressor in the air conditioning refrigeration section of a heater-ventilation, air-condition (HVAC) unit, an evaporator operates with respect to a fixed steady-state, evaporator surface temperature set point. This set point establishes a temperature reference about which the evaporator provides the coldest downstream air without the downstream surface fins of the evaporator developing frost due to the humid inlet air being warmer than the evaporator fin surface causing water to condense from the air and freeze.

An evaporator temperature probe mounts at a chosen spot to measure the downstream side of the evaporator to monitor changes of evaporator temperature with respect to the set-point temperature. The probe detects thermal changes on the downstream surface of the fins respect to the steady-state set point. Electrical resistance of the probe decreases as downstream surface temperature of the evaporator increases. Hence, an analog logical signal at an output terminal is used to indicate when the evaporator temperature rises above or falls below the set point by, illustratively, 1° F. This evaporator set point signal usually set in the factory to within a range suitable for normal weather conditions in most regions of the country, provides a signal to a control circuit for turning ON the fixed capacity compressor when the evaporator temperature exceeds the set point and turning OFF the compressor when the evaporator temperature goes below the set point. This cycling ON and OFF the compressor helps prevent the build-up of frost upon the downstream surface of the evaporator fins. However, due to the wide ranges of temperature and humidity in the various regions of the country, such a system usually does not operate efficiently in regions that experience cold or extreme hot temperatures.

In an effort to optimize the operation of the refrigeration section of the HVAC unit so that the evaporator operates without developing frost for all weather conditions, a search was initiated to find other schemes for controlling fixed capacity compressors. That search ended in the improved refrigeration section presented in the instant invention.

SUMMARY OF THE INVENTION

As a solution to these and other problems, the present invention provides an improved system for varying the steady state set point temperature of an evaporator in a refrigeration section of a heater-ventilation air-condition unit. More particularly, a computer using controlling and computing firmware and temperature values from an evaporator temperature probe and temperature values from an outside of the vehicle ambient temperature sensor generates desired evaporator set point values. Then, using the computed set point values, the computer provides control signals to a relay that controls cycling on and off a fixed capacity compressor in a manner that provide optimum cooling without causing frost on the downstream fins of the evaporator.

IN THE DRAWINGS

Figure 5:
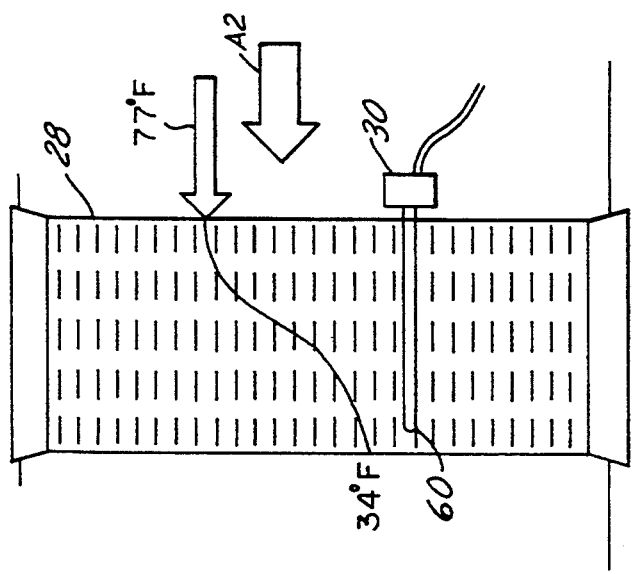
Figure 3A:
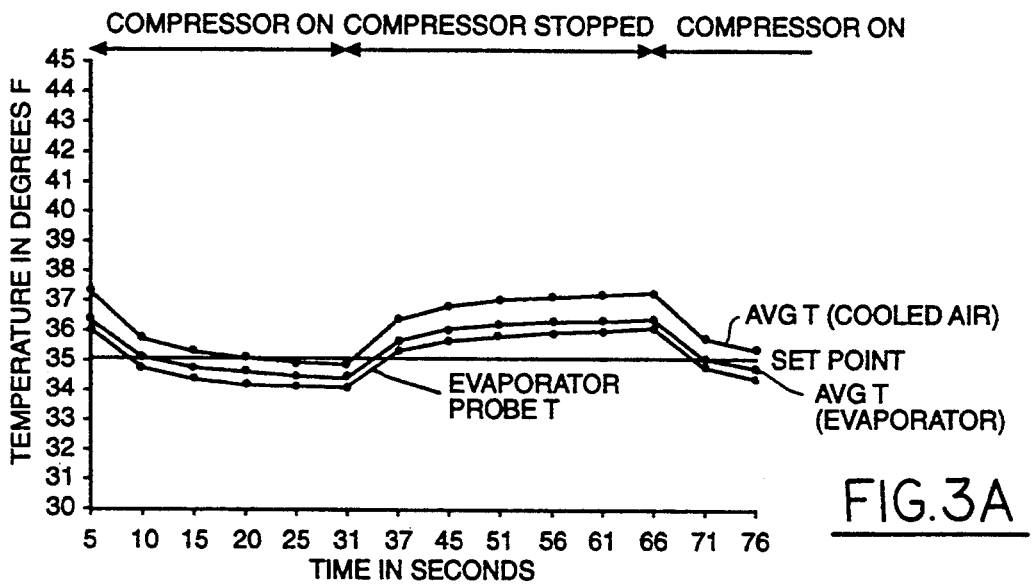
Figure 3B:
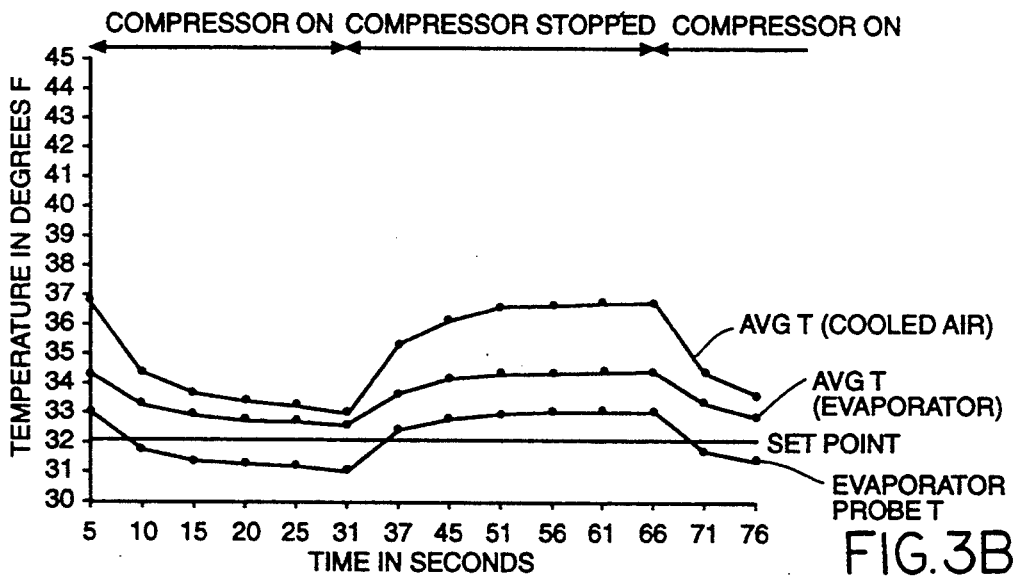
Figure 3C:
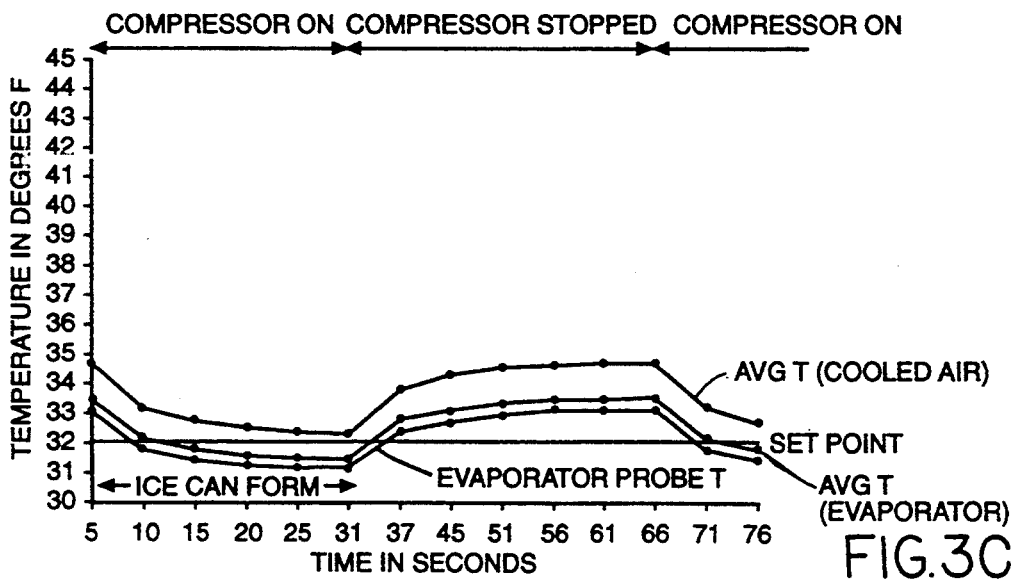
Figure 4:
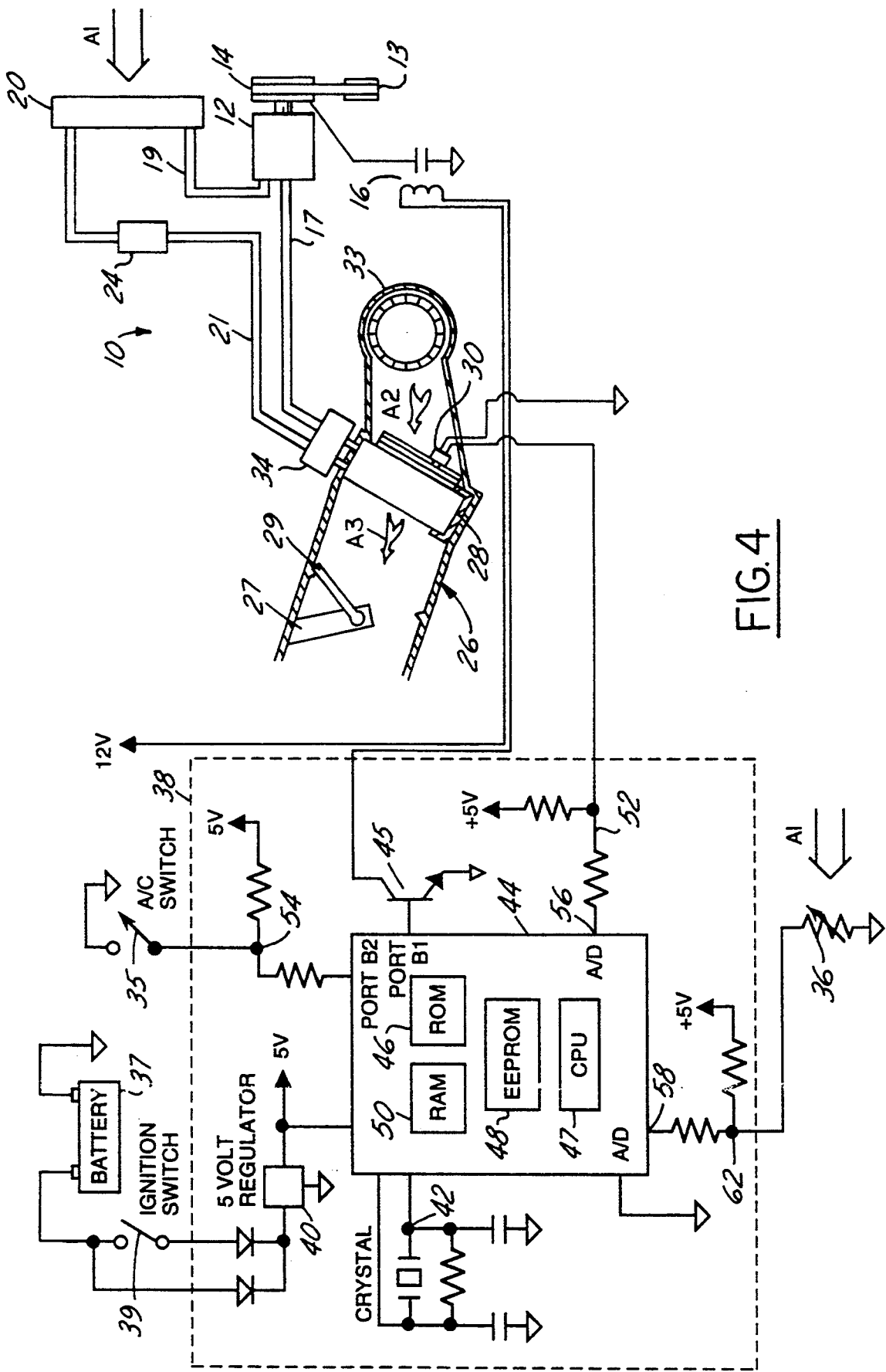
Figure 6:
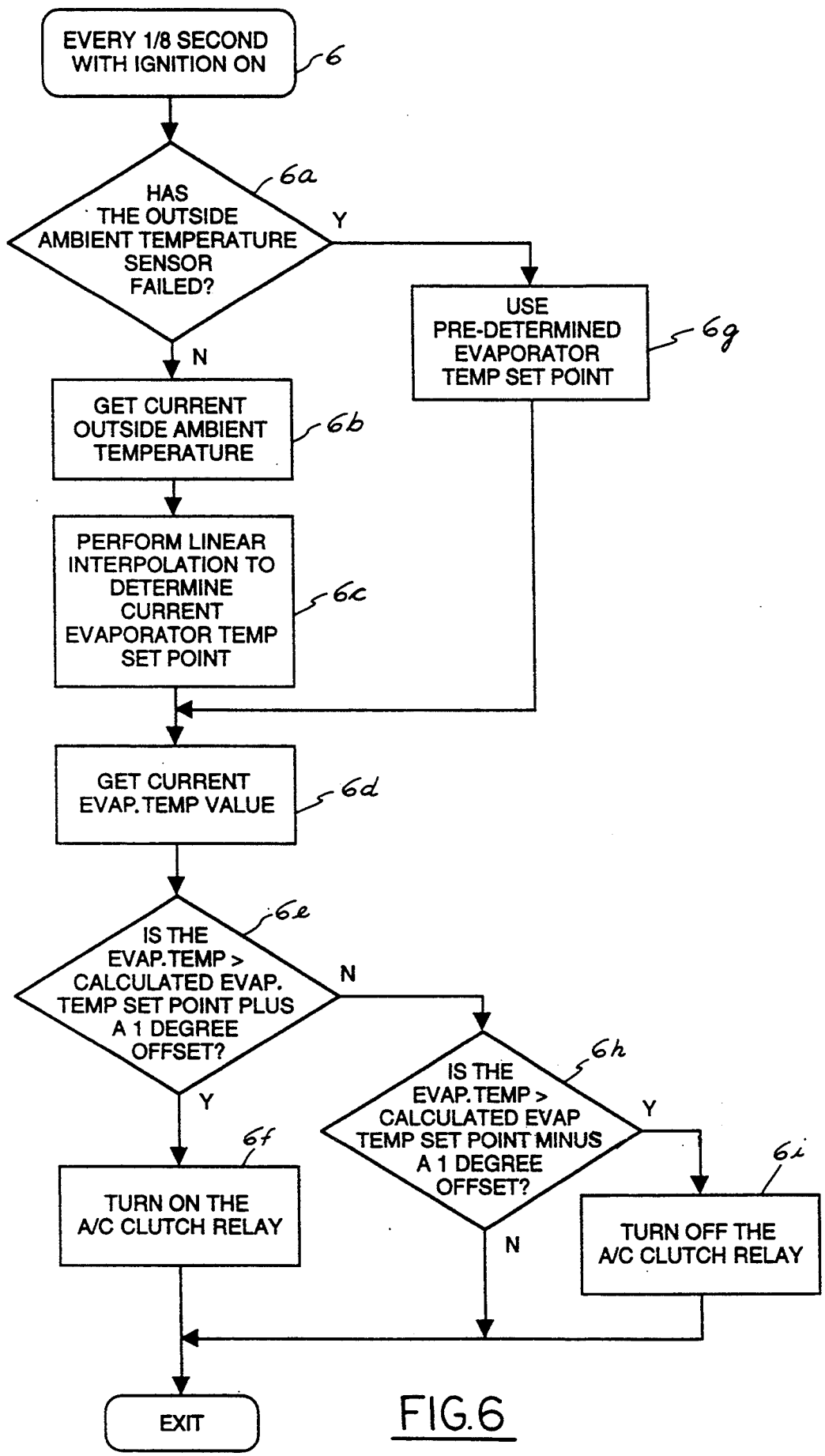

FIG. 3A depicts temperature plots of cooled air, the average temperature of evaporator 28, and the average temperature of the evaporator probe 30 with the setpoint of the evaporator fixed at 35.0°±1.0° f. and under the assumption that the ambient temperature is about 77° f.;

FIG. 3B depicts temperature plots of cooled air, the average temperature of evaporator 28, and the average temperature of the evaporator probe 30 with the setpoint of the evaporator fixed at 32.0°±1.0° f. and under the assumption that the ambient temperature is about 100° f.;

FIG. 3C depicts temperature plots of cooled air, the average temperature of evaporator 28, and the average temperature of the evaporator probe 30 with the setpoint of the evaporator fixed at 32.0°±1.0° f. and under the assumption that the ambient temperature is about 77° f.;

FIG. 4 illustrates in block diagram/schematic diagram form a prior HVAC system 10 incorporating a logic strategy that changes the steady state set point temperature value of the evaporator for different ambient temperature conditions so that cooling performance is optimized for all weather conditions;

FIG. 5. depicts the evaporator probe 30 wedge in the fins 28A of evaporator 28 with the sensing tip 60 of the probe detecting the downstream side of the fins;

FIG. 6 illustrates in flowchart form the operations performed by CPU 47 performed every ⅛ seconds with ignition switch 39 and air condition switch 35 turned ON to adjust the set point to the current conditions;

The flowchart of FIG. 6 provides a description of the operation of the firmware that instructs CPU 47 in performing varying the setpoint temperature of the evaporator by altering the cycling of the fixed capacity compressor.

DETAILED DESCRIPTION OF A PREFERRED EMBODIMENT

Figure 1:
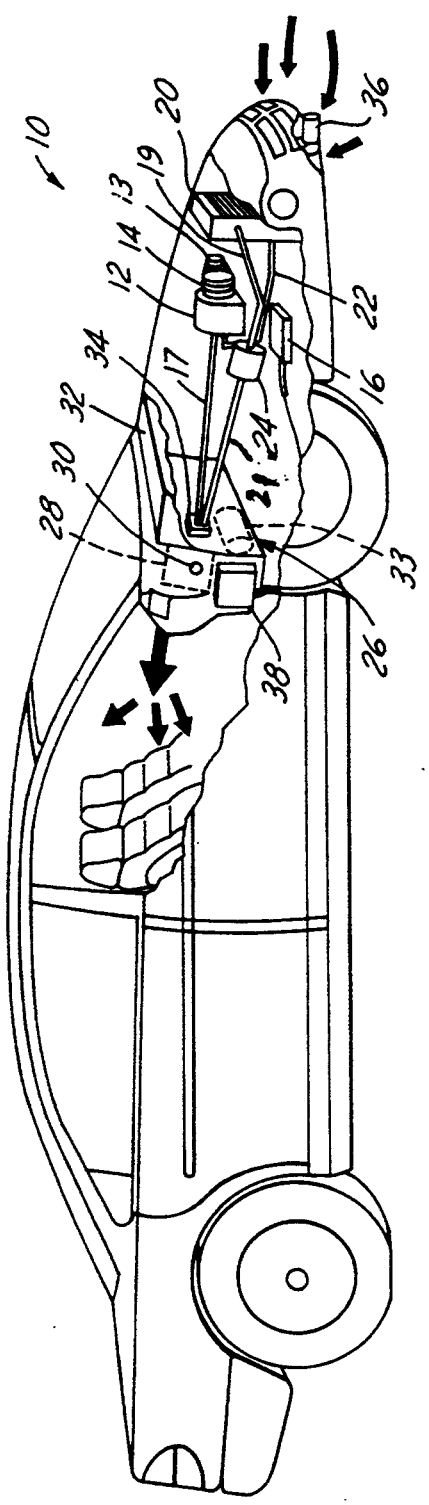
FIG. 1 depicts a cutaway side perspective view of an engine compartment of a vehicle to display the refrigeration section of HVAC system 10 of the present invention.

With reference to FIG. 1, this figure depicts a cutaway side view of the engine compartment of a vehicle to display the refrigeration section of HVAC unit 10 of the present invention. A pulley drive 13 connected to the engine of the vehicle (not shown) provides a driving source for driving fixed capacity compressor 12. An electromagnetic clutch 14 permits engagingly coupling and decoupling drive pulley 13 to and from compressor 12. Energizing and deenergizing relay 16 activates and deactivates, respectively, clutch 14.

A low pressure gas line 17 routes low pressure gas refrigerant from evaporator 28 to an inlet port of compressor 12. Compressor 12, having a fixed capacity for compressing the refrigerant, circulates the refrigerant now at a high temperature and pressure and, under a fixed discharge capacity caused by the compressing, into high pressure gas line 19 to condenser 20. After being liquified by cooler ambient outside air A1, the refrigerant routes through a high pressure liquid line 22 to a filter dryer 24 which removes the contaminants which might appear in the liquid. The high pressure liquid routes through high pressure line 21 to an automatic expansion valve 34 of the heat-sensitive type wherefrom the high pressure liquid emerges as low pressure and temperature mist in the evaporator. Ambient air A1 entering air inlet 32 near the windshield of the vehicle gets blown by fan 33, now high pressure ambient air A2, against the fins and surface of evaporator 28. The refrigerant, in the form of mist in evaporator 28 evaporates due to the high pressure ambient air A2 contacting the evaporator. The air A3, passing through evaporator 28, cools considerably with respect to air A2 as the misty refrigerant evaporates due to latent heat absorbed from air A2. This cooled air A3 passes into the passenger compartment of the vehicle after passing by blend door 29. Blend door 29, operated manually by an operator or automatically by an automatic temperature control unit (not shown), deflects all the cool air into the passenger compartment or deflects some of the cooled air through heater 27 to blend cool air with warm air to suit the operator's desires.

After absorbing the latent heat, the refrigerant as low pressure evaporated gas leaves the evaporator 28 through an outlet and routes through a low pressure gas line 17 back to compressor 12 for recycling.

Prior System Control Over the Steady State Set Point of the Evaporator

The steady state set point of temperature of the evaporator must be held cold enough to provide enough cold air to cool a hot passenger compartment. The set point temperature also must not be too cold or water in the form of humidity in the outside air will condense and freeze over the evaporator surface. The ice blocks the air from passing through the ventilating system causing the volume of air to drop which prevents proper cooling of the passenger compartment. This is commonly referred to as "evaporator freeze up". The control of the evaporator temperature to prevent ice formation is commonly referred to as "evaporator freeze control".

The freeze point of an evaporator will be more critical when the air drawn into the climate control system is colder. Typically, the set point temperature value is set at a fixed temperature so evaporator freeze up will not occur at all outside air temperatures or humidities. Colder outside air temperatures will require a slightly higher set point temperature value as compared to hot outside temperatures. A fixed set point temperature is set for the cold weather operation which compromises hot weather performance.

Figure 2:
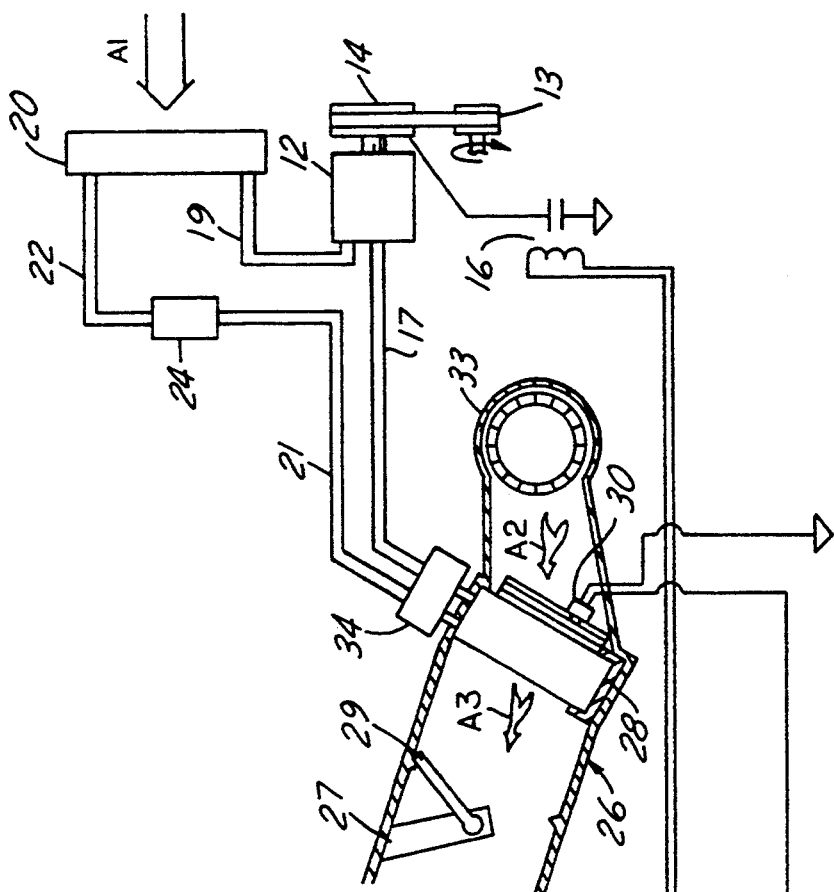
FIG. 2 illustrates a prior HVAC 10 in block diagram/schematic diagram form a prior HVAC system 10 with a steady state set point temperature fixed for cold weather operation which compromises hot weather performance.
Figure 2:
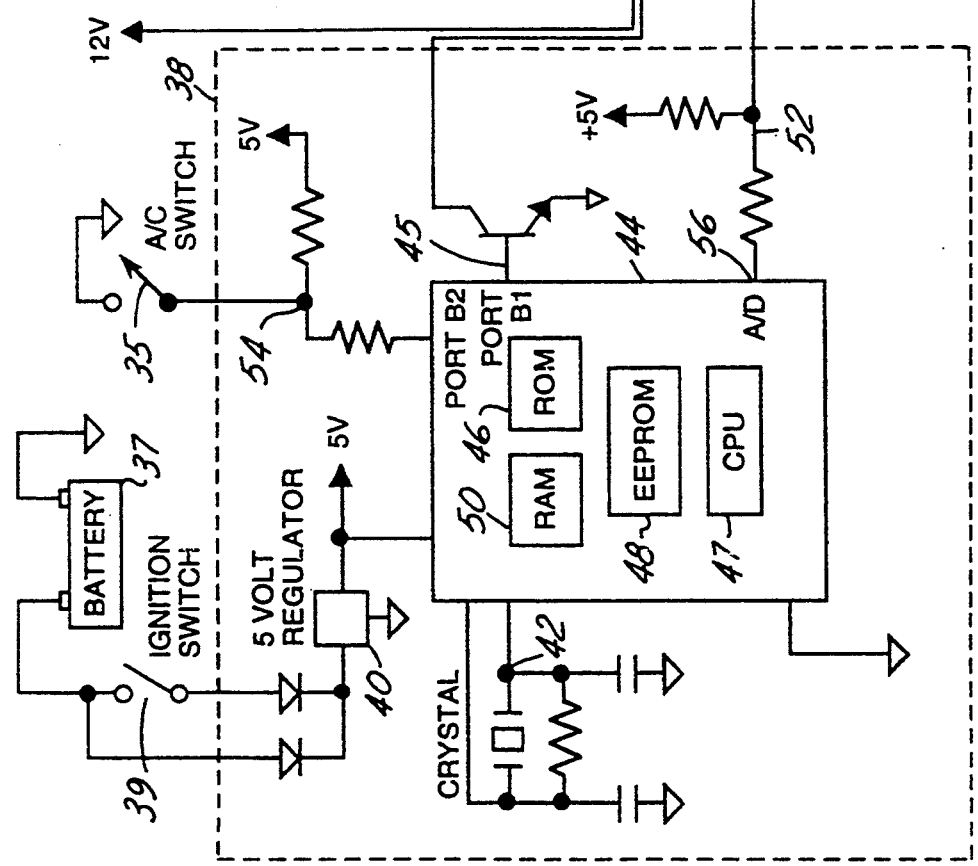

FIG. 2 illustrates in block diagram/schematic diagram form a prior HVAC system 10 with a steady state set point temperature set for the cold weather operation which compromises hot weather performance. This steady state set point equals a set point for clutch 14. After turning ON the ignition switch 39 to provide battery 37 power to body controller 38 and, after turning ON air conditioning switch 35, the heater-ventilation air conditioning (HVAC) system 10 operates.

Evaporator probe 30 measures the temperature of evaporator 28 and provides a DC voltage to voltage divider 52 and A/D port of microcontroller (MCU) 44. If the evaporator temperature is less than that of the steady state set point temperature by 1° F., then at port B1, MCU 44 will provide a logical LOW control signal to the base of switching transistor 45 to hold it cut off. If the evaporator temperature exceeds that of the steady state set point temperature by 1° F., then at port B1, MCU 44 will provide a logical HIGH control signal to the base of transistor 45 to turn it ON. Turned ON transistor 45 causes relay 16 to energize which in turn activates compressor clutch 14 to cause fixed capacity compressor 12 to initiate compression of the refrigerant at a fixed discharge pressure.

As mentioned supra, with a fixed steady state set point temperature, system 10 will operate effectively as long as outside air does not freeze over the evaporator surface.

To further illustrate the effects of using a fixed set point temperature setting, refer to FIG. 3A. FIG. 3A depicts temperature plots of cooled air, the average temperature of evaporator 28, and the average temperature of the evaporator probe 30 with the set-point of the evaporator fixed at 35.0°±1.0° f. with the assumption that the ambient temperature is about 77° f. This represents a situation where adequate cooling would occur in most of the United States of America (USA) and frost will not appear over the face of the evaporator in a state such as Michigan. The cooled air would not be adequate if the vehicle was driven in Florida where the ambient temperature might reach 100° f.

FIG. 3B depicts temperature plots of cooled air, the average temperature of evaporator 28, and the average temperature of the evaporator probe 30 with the set-point of the evaporator fixed at 32.0°±1.0° f. and under the assumption that the ambient temperature is about 100° f. This represents a situation where adequate cooling would occur in most of the USA including Florida. However, frost will appear over the face of the evaporator in a state such as Michigan at ambient temperatures of around 77° f. as shown in FIG. 3C. Frost or ice will appear on evaporator 28 when the average temperature of evaporator 28 is below 32° of depicted on FIG. 3C between 10 and 34 seconds.

Present Invention

FIG. 4 illustrates in block diagram/schematic diagram a prior HVAC system 10 incorporating a logic strategy that changes the steady state set point temperature value of the evaporator for different ambient temperature conditions so that cooling performance is optimized for all weather conditions. FIG. 4 is identical to FIG. 2 except for the addition of the ambient sensor 36 and the voltage divider network 62 that permits providing a divided down analog signal to A/D input 58 of MCU 44.

In addition to sensor 36, this present system includes firmware, depicted in FIG. 6, stored in ROM 46 for providing instructions to CPU 47 for executing operations associated with varying the set-point temperature of the evaporator. Table 1, stored in EEPROM 48 provides a look-up table which relates ambient temperature to a desired evaporator steady state set point temperature value. An Equation 1 stored in ROM 46 provides the relations needed to perform a linear interpolation if the ambient temperature falls between the values given in table 1. In a preferred embodiment, a MC68HC11 high-density CMOS (HCMOS) single-chip microcontroller from Motorola Inc. of Phoenix, Ariz. serves as MCU 44.

Sensors Used in Present System

FIG. 5 depicts temperature probe 30 wedged in the fins of evaporator 28 of the climate control unit 26. Probe 30 is wedged in the fins so that the sensing tip detects the downstream side of the fin at a particular location considered the coldest spot of evaporator 28. A temperature differential exists between probe 30 and the average temperature of the surface of evaporator 28.

Ambient temperature sensor 36 can be a conventional sensor but, in a preferred embodiment, the ambient temperature sensor described in patent application of Robert Rudzewicz et al., Ser. No. 08/869,479 filed Jun. 1, 1993 entitled "System and Method for Determining Ambient Temperature Outside of a Vehicle" should be used. The sensor described there, utilizes vehicle speed, time, engine temperature and an exterior temperature sensor measurement to determine the temperature of the air encountered by a driven vehicle. If the combination of factors indicate that the temperature measurement from the ambient temperature sensor is unreliable, because of non-ambient heat sources, then the software will not indicate the exterior sensor's, temperature and instead will indicate an approximate temperature. The approximate temperature is arrived at by averaging the value of the sensor's reading over a ten second period, taking a sample every ½ second. The approximate temperature is, in turn, used in the determination of the reliability of the current exterior sensor reading.

Determining the Desired Evaporator Steady State Set Point

Table 1 provides the look-up table that relates ambient temperature to a desired evaporator steady state set point temperature value.

TABLE 1

| Region | Ambient T° F. | Steady State Set Point in °F. |
|---|---|---|
| Equator | Above 100 | 32 |
| Florida | 100 | 32 |
| Tennessee | 77 | 35 |
| Michigan | 60 | 36 |
| Canada | 0 | 37 |

In the present invention, ambient sensor 36 of FIG. 4 measures the outside temperature of the vehicle and routes an analog signal representation of that value of temperature to A/D port 58 of MCU 44. MCU 44 uses a digital representation of the temperature value in Equation 1 to compute the desired set point for optimum cooling by changing the set point of clutch 14 to coincide with the computed set point.

Computing the Desired Steady State Set Point

To compute the desired steady state set point of evaporator 28, MCU 44 looks at Table 1 data stored in EEPROM 48 and determines if the ambient temperature measured by ambient temperature sensor 36 coincides with one of the 5 values specified in the table. If the measured temperature value coincides with one of the 5 values in table 1, then MCU 44 picks the corresponding desired evaporator steady state set point temperature and adjusts the timing of the control signal issued from port B1 used to switch switching transistor 45 ON and OFF. Turning transistor 45 ON and OFF at the adjusted timing rate causes relay 16 to energize and deenergize at a corresponding rate so as to cause compressor clutch 14 to engage fixed capacity compressor 12 at a like rate. Varying the rate compressor 12 compresses the refrigerant varies the set point of evaporator 28 as a function of the ambient temperature.

Finding New Set Point By Performing Linear Interpolation

If the ambient temperature falls between the five values given in Table 1, then CPU 47 is given instructions to calculate the steady state evaporator set point temperature by linear interpolation using Equation 1.

Equation 1

$$Y = Y_{LO} + \frac{(Y_{HI} - Y_{LO})}{(X_{HI} - X_{LO})} * (X - X_{LO}) \qquad (1)$$

As the reading from ambient sensor 36 arrives at A/D port 58, the digital representations get stored in RAM 50. The X entries are searched for $X_{HI}$ and $X_{LO}$ values. $X_{LO}$ represent the closest entry in Table 1, which is less than the reading obtained by sensor 36, while $X_{HI}$ is the adjacent table entry which is greater than the reading obtained by sensor 36. $Y_{HI}$ and $Y_{LO}$ are the desired evaporator steady state set point temperatures corresponding to $X_{HU}$ and $X_{LO}$, respectively.

Once the linear interpolation is performed, MCU 44 adjusts cycle time of compressor 12 accordingly.

OPERATION OF THE SYSTEM

The flowchart of FIG. 6 provides a description of the operation of the Vehicle Air Conditioner, Automatic Variable Set Point Evaporator System 10.

In a vehicle, CPU 47 shares software operations with several other systems associated with the vehicle. However, the program for varying the steady state set point temperature of evaporator 28 resides in a background routine (a non-interrupt routine) or the main program. Interrupt signals from the climate control display head (not shown), power source 40, a reset IC (not shown) of 500 μs pulses from an internal output compare circuit do interrupt the background routine during operation of HVAC 10.

An ⅛ second measured interval from a RAM based counter generates in the background program after enough 500 μs interrupt signals exit an internal output compare circuit in MCU 44. As mentioned supra, the output compare signal occurs every 500 μs. The RAM based counter increments every time the output compare signal appears. When this counter reaches 62 (31 ms.) or 63 (31.5 ms.) (the required value alternates to generate a 62.5 (31.25 ms.) average count), a 1/32 second task in a task dispatcher is queued. A RAM based counter associated with this 1/32 second task is incremented and is used to determine when to queue the 1/16, ⅛, ¼, ½, 1,2,4 and 8 second task for execution by a background program task dispatcher. This embodiment uses the 1/32 second task, the interval of the motor control routine; and the ⅛ second task, the interval of the automatic variable set point temperature system updates.

With reference to FIG. 6, at step 6, the firmware program for updating the set point temperature starts every ⅛ second which the ignition and air conditioning system turned on. At step 6a, CPU 47 receives instructions to determine whether the outside ambient temperature sensor 36 has failed. If the sensor has failed then, CPU 47 receives instructions to branch to step 6g and execute the instruction to use the predetermined evaporator temperature set point to set the clutch set point. If the sensor has not failed, then CPU 47 receives the instruction at step 6b to get the current outside ambient temperature. Then proceed to step 6c and use the instruction to perform linear interpolation to determine the current evaporator temperature set point.

After obtaining either the pre-determined set point or the calculated set point, CPU 47 receives the instruction at step 6d to get the evaporator temperature value from the evaporator sensor 30. Then at step 6e, CPU 47 receives instructions to determine whether the evaporator temperature is greater than the calculated evaporator temperature set point plus a 1 degree offset. If so, CPU 47 receives the instruction at step 6f to send a control signal to transistor 45 which would cause the relay 16 to energize, causing compressor clutch 14 to engage compressor 12 to start the compression of the refrigerant.

If the evaporator temperature is less than the calculated evaporator temperature set point minus a 1 degree offset, then CPU 47 receives the instruction at step 6l to send control signals to relay 16 which would cause the turn OFF of compressor 12. If the evaporator temperature is not less than the calculated evaporator temperature set point minus a 1 degree offset, then CPU 47 will exit the routine.

It is understood that the above-described embodiments are mainly illustrative of the principles of the invention. One skilled in the art may make changes and modifications to the embodiments without departing from the scope and the essential characteristics therefore.

What is claimed is:

1. An automatic variable set point evaporator system for a vehicle air condition system comprising:
   (A) an input power device having terminals for receiving electric power from a designated source and generating therefrom regulated power used by components in the system, the input device including an ON and OFF switch for applying and removing electric power from the system when desired;
   (B) a refrigeration system having:
      (1) a pulley drive for coupling the air condition system to a rotation source of an engine of the vehicle;
      (2) a compressor clutch coupler to the pulley drive for coupling in and out the rotation source of the engine;
      (3) a fixed capacity compressor having a pulley attached to the clutch for receiving rotations from the engine rotational source when the clutch engages the rotational source and having an input port for receiving a flow of refrigerant which is compressed to a fixed capacity pressure as the pulley rotates and, after compressing the refrigerant, producing at an output port the refrigerant at a high temperature and under a fixed discharge pressure caused by the compressing;
      (4) a condenser disposed at the front of the vehicle to receive outside ambient air and having an input port for receiving the compressed refrigerant and, after being cooled by cooler outside ambient air, the refrigerant liquifies and exits the condenser through an output port;
      (5) a filter dryer having a port coupled to a high pressure liquid line receives the high pressure liquid and remove contaminates which might appear and thereafter filtering the liquid refrigerant producing at an output port the filtered refrigerant;
      (6) an automatic expansion valve having an input port for receiving the filtered refrigerant and producing therefrom at an output port a low pressure mist;
      (7) an evaporator disposed to receive outside air blown across fins arranged on a front surface by a fan disposed to blow the outside air across the fins and having an input port for receiving the refrigerant as the low pressure mist and after the mist evaporates due to absorbing the latent heat from the air blown against the front surface and through the evaporator producing therefrom cooled air with latent heat removed from a back surface of the evaporator;
      (8) a climate control unit connected between a passenger compartment of the vehicle and the back surface of the evaporator for directing the cooled air into the passenger compartment; and
      (9) a clutch relay having input terminals for receiving a control signal used for energizing or deenergizing the relay and producing at an output terminal activating or deactivating signals to the compressor clutch so as to turn ON and OFF the compressor at a rates permitting varying the rate of supplying refrigerant to the evaporator so as to vary the steady state set point temperature of the evaporator probe as a function of the ambient temperature;
   (C) an evaporator probe wedged in the fins of the evaporator on the front surface which protrudes to the rear surface of the evaporator and producing from the measurements an analog signal representation of the fin temperature, the end of the probe being the sensing area that contacts the downstream portion of the fin;
   (D) an ambient sensor mounted on a front surface of the vehicle for measuring the ambient temperature in proportionate to the ambient environment created by a moving vehicle and producing therefrom at an output terminal an analog signal representative of the measured temperature;
   (E) a compressor clutch control circuit having a switching device for energizing and deenergizing the clutch relay in response to control signals for establishing a clutch set point time that is proportional to the steady state set point temperature of the evaporator probe;
   (F) a microcontroller unit (MCU) having:
      (1) a timer system which provides a reference clock signal and operates in conjunction with RAM based counters to provide therefrom at an output terminal a clock signal proportioned to a chosen frequency of the reference clock signal;
      (2) a first analog to digital converter having a terminal connected to receive the analog signal from the evaporator probe and producing therefrom digital values representative of the evaporator temperature which are stored in RAM of the MCU;
      (3) a second analog to digital converter having a terminal connected to receive the analog signal from the ambient sensor and producing therefrom digital values representative of the ambient temperature while the vehicle is moving which are also stored in RAM of the MCU;

(4) a look-up table stored in an EEPROM of the MCU which relates ambient temperature values to desired evaporator steady state set point temperature values for a selected temperature related environments;

(5) interpolation firmware stored in an ROM of the MCU for providing a means for determining evaporator probe steady state set point temperatures which do not appear in the look-up table stored in the EEPROM;

(6) an output switching circuit connected to the compressor clutch relay for turning ON and OFF the clutch relay in a manner that causes the compressor to provide refrigerant to the evaporator so that the set point temperature of the evaporator varies automatically in proportionate to changes in the ambient temperature; and (7) compressor clutch set point control firmware stored in ROM for providing instructions to a CPU in the MCU for obtaining from RAM changes in ambient temperature values and for obtaining from RAM changes in evaporator fin temperature and for computing various set point values and thereafter providing instructions to the CPU for producing output signals to the output switching circuit for causing the switching circuit to turn ON and OFF the clutch relay in a manner that causes the compressor to provide refrigerant to the evaporator so that the set point temperature of the evaporator varies automatically in proportionate to changes in the ambient temperature so as to provide optimum cooling to the passenger compartment of the vehicle and so as to prevent frost from building up on the fins of the evaporator.

2. Apparatus in accordance with claim 1 wherein the means for determining the evaporator steady state set point temperatures which do not appear in the look-up table is a mathematical relationship which relates the measured ambient temperature to existing ambient temperature values in the look-up table and then from the relationship produce desired evaporator set points proportional to the measured ambient temperature.

3. Apparatus in accordance with claim 1 wherein changes in ambient temperature values submitted to the MCU provide changes in cycle time of the compressor without changing the discharge capacity pressure of the compressor, wherein the capacity of the compressor remains fixed while the set point of the evaporator varies in proportion to changes in set point temperatures developed by the firmware and software in the MCU.

4. Apparatus in accordance with claim 1 wherein the evaporator probe is wedged in the fins of the evaporator in a location that provides the coldest temperature appearing on the front surface which protrudes to the rear surface of the evaporator, the end of the probe 60 being the sensing area contacts the downstream portion of the fin.

5. A software/firmware method for varying the set point temperature of an evaporator in a refrigeration section of an heater-ventilation air-condition system of a vehicle in response to changes in climatic conditions comprising the steps of:

(A) providing a look-up table that relates a chosen number of ambient temperature values to corresponding desired evaporator steady state temperature values;

(B) providing a linear interpolation relationship for computing steady state set point values for ambient temperature values falling in between the values provided in the look-up table;

(C) obtaining and storing the temperature reading at the coldest spot on the front surface fins of the evaporator;

(D) obtaining and storing the outside temperature reading of the ambient air as the vehicle moves;

(E) computing desired evaporator steady state set point values with respect to the ambient temperature values stored in the look-up table;

(F) performing linear interpolation of ambient temperature values so as to determine set points temperatures if the ambient temperature value does not appear in the look-up table; and (G) turning a compressor of the refrigeration section ON and OFF in a manner which develops steady state set point temperatures in the evaporator proportionate to the computed set point values so as to produce optimum cooling as the ambient temperature varies.

* * * * *